United States Patent [19]

Hohman

[11] Patent Number: 4,906,032
[45] Date of Patent: Mar. 6, 1990

[54] TAIL PIPE COUPLING DEVICE

[76] Inventor: Fredric J. Hohman, 1111 Hayden Ave., Altoona, Wis. 54720

[21] Appl. No.: 254,210

[22] Filed: Oct. 6, 1988

[51] Int. Cl.⁴ ............................................. F16L 37/26
[52] U.S. Cl. .................................... 285/319; 285/177; 285/242
[58] Field of Search ............... 285/319, 320, 305, 191, 285/417, 418, 903, 242, 177

[56] References Cited

U.S. PATENT DOCUMENTS

| | | |
|---|---|---|
| 1,112,681 | 10/1914 | Crane . |
| 1,390,950 | 9/1921 | Avery . |
| 1,725,834 | 8/1929 | Sinkes . |
| 1,879,581 | 9/1932 | Stougaard . |
| 2,260,454 | 10/1941 | Hedeman ............................ 285/242 |
| 2,467,922 | 4/1949 | Woytal et al. . |
| 2,667,372 | 1/1954 | Gardner ............................. 285/177 |
| 2,733,668 | 2/1956 | Pfetzing . |
| 2,789,841 | 4/1957 | Kramer ............................. 285/242 |
| 2,990,198 | 6/1961 | Imming . |
| 3,168,382 | 2/1965 | Chambers et al. .................. 285/319 |
| 4,102,254 | 7/1978 | Grant . |
| 4,693,421 | 9/1987 | Cameron, Sr. ..................... 285/177 |

FOREIGN PATENT DOCUMENTS 872931 7/1981 United Kingdom ............... 285/319

Primary Examiner—Randolph A. Reese
Assistant Examiner—Anthony Knight
Attorney, Agent, or Firm—Dorsey & Whitney

[57] ABSTRACT

A coupling device for releasably attaching an exhaust hose to the tail pipe of an internal combustion engine to conduct exhaust from an enclosed work space to the atmosphere. The coupling device is characterized by a pair of finger-like opposed spring members cantilever mounted inside a tubular coupling member at points spaced from one end, each extending longitudinally beyond one end of the tubular section and each biased outwardly against the inside surface of the tubular coupling member. The finger-like members are urged inwardly against their bias and inserted into the tail pipe as the coupling member is placed over the end of a tail pipe in a female-male relationship, releasably securing the coupling device in sealed relationship with the tail pipe.

8 Claims, 1 Drawing Sheet

TAIL PIPE COUPLING DEVICE

BACKGROUND OF THE INVENTION

1. Field

The invention is a coupling device for connecting a hose to the tail pipe or exhaust pipe of an internal combustion engine to conduct exhaust from the tail pipe and from an enclosed space, such as a garage or the repair bay of a service station, to the atmosphere.

Engine repair and adjustment is often carried out in an enclosed space and it is often necessary or desirable to run the engine in the enclosed space for testing and adjustment. It is, of course, well known that if carbon monoxide containing exhaust accumulates in the enclosed space results can be fatal and, consequently, there must be significant ventilation of the work space during discharge of exhaust into the space or the exhaust must be conducted out of the enclosed work space to the atmosphere.

2. Related Art

It is a common practice in service stations to place a corrugated rubber hose over the tail pipe of an automobile and pass the hose through an opening in the overhead door to thereby conduct exhaust from the tail pipe to the atmosphere. Customarily, in practice, no special adaptor or coupling device is used; the hose is merely placed over the tail pipe in a loosely-fitting, female-male relationship. This practice allows leakage of exhaust into the work bay of the service station from the joint between the hose and the tail pipe. In addition, the hose is easily knocked-off the tail pipe. It also often becomes melted at the point of engagement with the tail pipe, which gets hot after the engine has run for a few minutes and often falls off, thereby allowing exhaust to be discharged into the enclosed work space. For these reasons the present practice is far from ideal.

The problem of conducting exhaust from an enclosed work space to the atmosphere has been recognized and addressed in prior art patents including Crane (1,112,681), Avery (1,390,950), Sinkes (1,725,834), Stougaard (1,879,581), Woytal et al. (2,467,922), Pfetzing (2,738,668), Imming (2,990,198) and Grant (4,102,254). Each of these prior art patents shows a coupling device of one form or another to couple an exhaust hose to the tail or exhaust pipe of an automobile engine. In each case, however, structure is provided that requires setting thumb screws or wing nuts (Avery and Woytal et al), using hooks (Crane and Pfetzing), using magnetic devices (Imming), using special threaded adaptor devices permanently attached to the tail pipe for threaded releasable attachment to a mating adaptor on an exhaust hose (Sinkes) or complicated swing-up structures that swing into insecure relationship with the tail pipe (Stougaard and Grant).

In each of these prior art devices there is complicated structure which adds expense, makes attachment and release more complicated and often less secure, and adds to the maintenance of the device.

SUMMARY

The present invention provides for quick and convenient releasable attachment to a range of tail pipe sizes and provides an efficient seal between the tail pipe and the coupling device so that there is no significant leakage of exhaust into the work space. It can be attached without tightening any thumb screws or wing nuts, without hooks or threaded devices and without complicated magnetic or swing-up structure. It is easily attached and easily removed, requires little or no maintenance, and can be provided at reasonable cost.

The invention consists of a coupling device for releasably connecting the tail pipe of an internal combustion engine to an exhaust hose to thereby conduct exhaust from the engine to the atmosphere and comprises a tubular coupling member with an inside transverse dimension greater than the outside transverse dimension of the tail pipe and a plurality of opposed finger-like spring members, each cantilever mounted at one end thereof inside the tubular coupling member at points spaced from the end of the tubular coupling member, each extending longitudinally beyond the same end of the tubular coupling member, and each biased outwardly against the inside surface of the tubular coupling member. The tubular coupling member is typically cylindrical to conform to the typically cylindrical tail pipe. It can also be flared thereby forming an enlarged tail pipe engaging section, which fits over the tail pipe in a female-male relationship. In the preferred embodiment, the finger-like spring members are formed from a continuous, U-shaped, wire spring member, centrally disposed inside the tubular coupling member, and extending the length thereof, with the fingers extending beyond the flared end of the section. The U-shaped wire spring member is preferably attached to the tubular coupling member without weldment through the use of a yoke member welded tranversely across one end of the tubular member, in which the apex of the U-shaped spring member is seated, and a retainer strip secured to the yoke member across the apex of the spring member, holding the spring member in place.

DESCRIPTION OF THE DRAWINGS

FIG. 2 also shows the portion of the tail pipe and exhaust hose in the area designated 2 on FIG. 1;

DESCRIPTION OF PREFERRED EMBODIMENT

Figure 1:
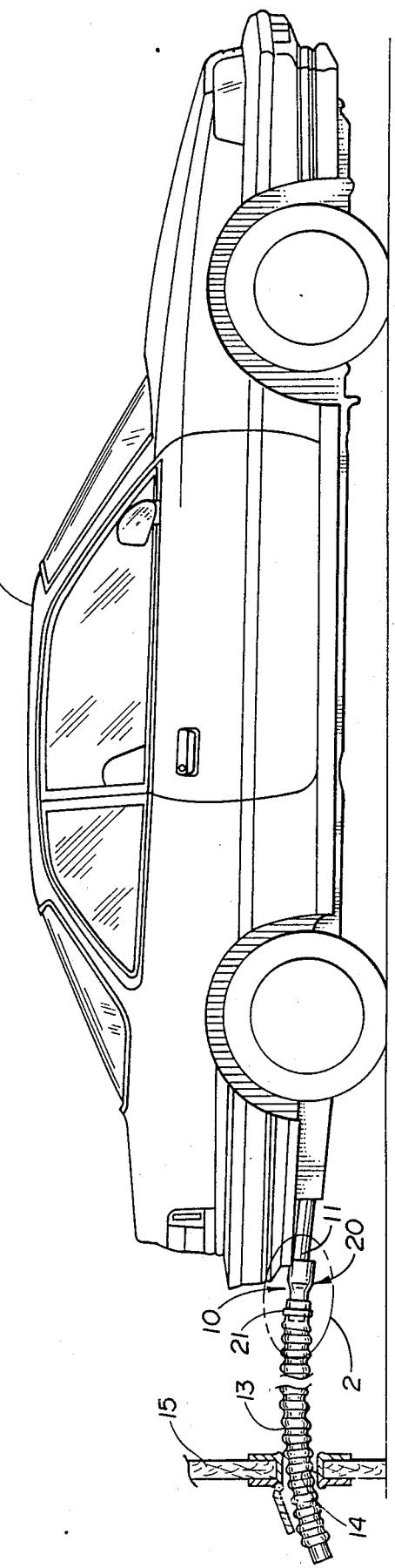
FIG. 1 is a side view of an automobile with the coupling device of the present invention attached to the tail pipe of the automobile and with an exhaust hose attached to the coupling device and extending through an opening in an overhead door (shown partially) to the atmosphere.

The coupling device 10 of the present invention is shown in FIG. 1, in place on the tail pipe 11 of automobile 12 to conduct exhaust from tail pipe 11 through corrugated hose 13 and out the opening 14 in door 15 to the atmosphere.

Figure 3:
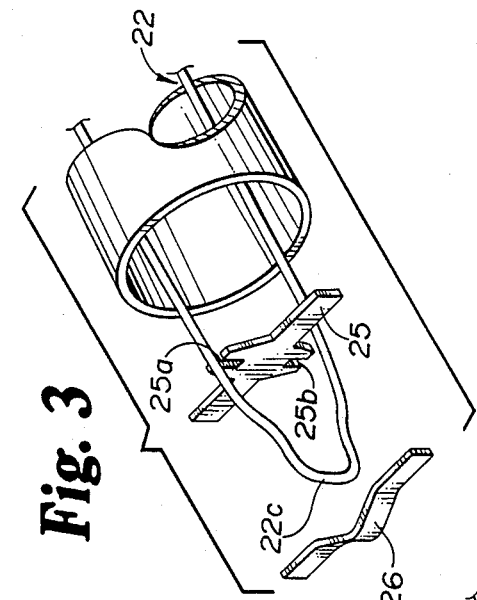
FIG. 3 is an exploded, partial perspective view of the exhaust hose end of the coupling device of the present invention and shows the yoke member, retainer strip and the apex end of the U-shaped spring member.
Figure 2:
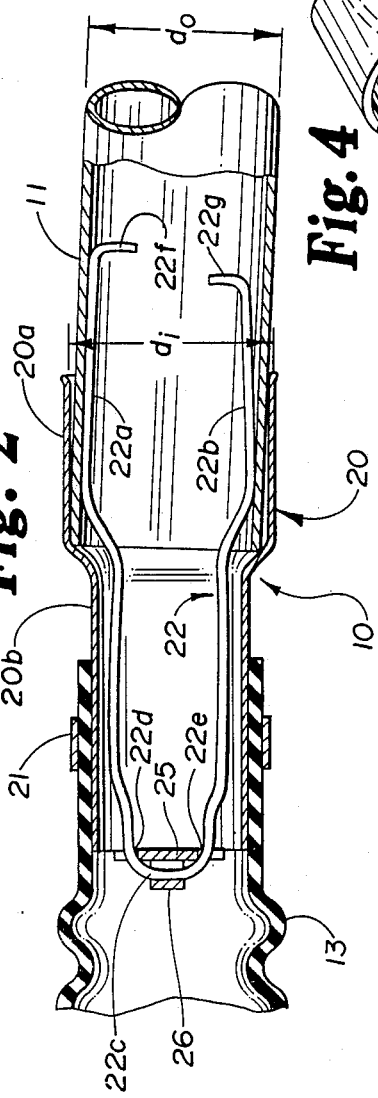
FIG. 2 is an enlarged longitudinal sectional view of the coupling device of the present invention, releasably attached to the tail pipe of an automobile.
Figure 4:
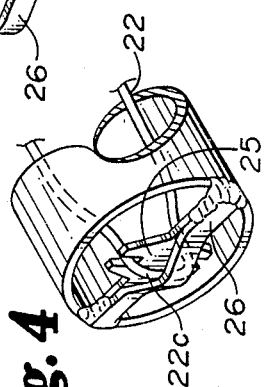
FIG. 4 is a partial perspective view of the exhaust hose end of the coupling device of the present invention and shows the manner in which the U-shaped spring member is seated at its apex in the yoke member and retained in the seated position by the retainer strip, without weldment of the spring member to the tubular coupling member.

Coupling device 10 is shown in greater detail in FIGS. 2-4. With reference to FIGS. 2-4, coupling device 10 includes a tubular coupling member 20, which is cylindrical and has an inside transverse dimension $d_i$ which is greater than the outside transverse dimension $d_o$ of tail pipe 11. In order to accommodate a range of tail pipe sizes presently in use the inside transverse dimension $d_i$ should be about two and one-half inches to accommodate tail pipe diameters of one and one-fourth to two and one-half inches Tubular coupling member 20 includes a flared enlarged tail-pipe engaging section 20a and a smaller exhaust-hose engaging section 20b. Exhaust hose 13 mates with exhaust hose engaging section 20b of tubular member 20 in a female-male relationship as shown in FIG. 2, and is held semi-permanently in place by hose clamp 21.

A U-shaped continuous wire spring member 22 forms a pair of opposed finger-like spring members 22a and 22b and includes an apex 22c. Finger-like spring members 22a and 22b are cantilever mounted inside tubular member 20 at points 22d and 22e spaced from the end 20c of tubular section 20, and extend longitudinally beyond end 20c a substantial distance, best seen in FIG. 2, terminating at bends 22f and 22g, which extend inwardly toward the opposite finger-like spring members 22b and 22a, respectively. Finger-like spring member 22a is preferably made longer than spring member 22b to facilitate mounting of the coupling device on tail pipe 11. Spring members 22a and 22b are biased outwardly against the inside surface of the flared end section 20a of tubular coupling member 20.

Opposed finger-like spring members 22a and 22b are cantilever mounted in tubular member 20 without weldment on spring member 22 so that its resilient property is not altered by the heat treatment effect of welding, and so that it is completely free to move outwardly in response to its bias into engagement with the inside surface of flared section 20 of tubular section 20. The weldment free mounting of spring member 22 is best seen in FIGS. 3 and 4. For that purpose, yoke member 25 extends diametrically across the end of exhaust hose engaging section 20b and is welded thereto. Yoke member 25 includes slots 25a and 25b which are located at the apex 22c of spring member 22, so that the fingers 22a and 22b can seat in slots 25a and 25b, respectively, at points 22d and 22e, respectively. Spring retainer strip 26 extends over the apex 22c of spring member 22 and is welded to the ends of yoke member 25 and sandwiches apex 22c of spring member 22 between itself and yoke member 25, thereby cantilever mounting spring member finger-like spring members 22a and 22b inside tubular member 20 of coupling device 10. This mounting avoids weldment directly on spring member 22.

It should be noted that finger-like members 22a and 22b of spring member 22 are bent throughout their length from apex 22c to bends 22f and 22g to conform generally to the inside surface of tubular section 20, as best seen in FIG. 2.

Coupling device 10 is formed preferably of metal, but may also be formed of components that do not melt or deform in the temperature range of the exhaust being conducted from the tail pipe.

OPERATION

Coupling device 10 serves to releasably and conveniently attach exhaust hose 13 to tail pipe 11 to thereby conduct exhaust from tail pipe 11, as best shown in FIGS. 1 and 2. Coupling device 10 is semi-permanently attached to exhaust hose 13 by means of hose clamp 21. It is then releasably attached to tail pipe 11 when the engine of automobile 12 is to be run in an enclosed space by inserting fingers 22a and 22b inside tail pipe 11. Insertion is made more convenient by the extension of finger 22a beyond the length of finger 22b and by bends 22f and 22g. The flared end 20a of tubular section 20 is placed over the end of tail pipe 11 in a female-male relationship as shown in FIG. 2. Finger-like spring members 22a and 22b engage the inside surface of tail pipe 11 and hold coupling device 10 in position in engagement with the end of tail pipe 11 to conduct exhaust from tail pipe 11, through coupling device 10, through exhaust hose 12 and out the opening 14 of door 15 to the atmosphere, as shown in FIG. 1. Spring members 22a and 22b can be compressed toward each other a substantial distance to fit inside tail pipes of varying diameter in the range of one and one-fourth to two and one-half inches. When work is complete on automobile 12, coupling device is pulled off of tail pipe 11 and is ready for reuse.

Coupling device 10 thus provides a convenient, releasable connection to tail pipe 11 without the shortcomings associated with the common practice of simply placing a corrugated exhaust hose over the end of the tail pipe and without the complication, maintenance and expense of manufacture associated with devices of prior art patents.

Having thus described the invention, the following is claimed.

I claim:

1. An exhaust-pipe coupling device for releasably connecting the tail pipe of an internal combustion engine to an exhaust hose to thereby conduct exhaust from the engine comprising:
   a. a cylindrical coupling member having a flared inside transverse dimension greater than the outside transverse dimension of the tail pipe, thereby forming an enlarged tail pipe engaging section and a smaller exhaust-hose engaging section; and
   b. a plurality of opposed finger-like spring members formed from a continuous, U-shaped, wire spring member, centrally disposed inside the coupling member, each cantilever mounted inside the tubular coupling member at points spaced from the flared end of the coupling member, each extending longitudinally beyond the flared end of the coupling member, and each biased outwardly against the inside surface of the coupling member.

2. The exhaust-pipe coupling device of claim 1 wherein the opposed spring members are cantilever mounted inside the tubular member by means of a yoke member extending diametrically across and secured to the end of the exhaust hose engaging section, the continuous, U-shaped, wire spring member is seated at the apex thereof in the yoke member, and a spring retainer strip is secured to the yoke member at each end thereof and extends across the apex of the U-shaped, wire spring member, thereby securing the spring member in the yoke without weldment thereto.

3. The exhaust-pipe coupling device of claim 2 wherein the cantilevered end of each of the finger-like spring members is bent inwardly toward the opposed finger-like spring member.

4. The exhaust-pipe coupling device of claim 3 wherein the continuous, U-shaped, wire spring member is bent to conform to the inside diameter of the smaller hose-engaging section and the inside diameter of the flared enlarged tail-pipe-engaging section.

5. A system for conducting exhaust from the tail pipe of an internal combustion engine from an enclosed space to the atmosphere which comprises:
  a. an exhaust hose extending from the enclosed space to the atmosphere,
  b. a coupling device for releasably connecting the exhaust hose to the tail pipe to thereby conduct exhaust from the engine to the atmosphere, comprising:
  (1) a cylindrical coupling member having a flared inside transverse dimension greater than the outside transverse dimension of the tail pipe, thereby forming an enlarged tail pipe-engaging section and a smaller exhaust hose-engaging section, and
  (2) a plurality of opposed finger-like spring members formed from a continuous, U-shaped, wire spring member, centrally disposed inside the coupling member, each cantilever mounted inside the tubular coupling member at points spaced from the flared end of the coupling member, each extending longitudinally beyond the flared end of the coupling member, and each biased outwardly against the inside surface of the coupling member, and wherein;
  c. the smaller exhaust hose-engaging section is connected to the exhaust hose, and
  d. the enlarged tail pipe-engaging section is releasably connected to the tail pipe in a female-male relationship enveloping the end of the tail pipe with the finger-like spring members extending inside the tail pipe, biased outwardly into engagement with the inside surface thereof, thereby conducting exhaust from the engine to the atmosphere.

6. The system of claim 5 wherein the opposed spring members are cantilever mounted inside the tubular member by means of a yoke member extending diametrically across and secured to the end of the exhaust hose engaging section, the continuous, U-shaped wire spring member is seated at the apex thereof in the yoke, and a spring retainer strip is secured to the yoke member at each end thereof and extends across the apex of the U-shaped, wire spring member, thereby securing the spring member in the yoke without weldment thereto.

7. The system of claim 6 wherein the cantilevered end of each of the finger-like spring members is bent inwardly toward the opposed finger-like spring member.

8. The system of claim 7 wherein the continuous, U-shaped, wire spring member is bent to conform to the inside diameter of the smaller hose-engaging section and the inside diameter of the flared enlarged tail-pipe-engaging section.

* * * * *